United States Patent [19]

Gulick et al.

[11] Patent Number: 5,199,064
[45] Date of Patent: Mar. 30, 1993

[54] FULLY-INTEGRATED TELEPHONE UNIT

[75] Inventors: Dale E. Gulick; Herbert Chen; Alan F. Hendrickson, all of Austin, Tex.

[73] Assignee: Advanced Micro Devices, Inc., Sunnyvale, Calif.

[21] Appl. No.: 589,327

[22] Filed: Dec. 3, 1990

[51] Int. Cl.$^5$ .............................................. H04M 1/60
[52] U.S. Cl. .................................... 379/387; 379/388; 379/389
[58] Field of Search ............... 379/387, 388, 389, 283, 379/284, 352, 355, 356, 420

[56] References Cited

U.S. PATENT DOCUMENTS

| | | | |
|---|---|---|---|
| 4,560,840 | 12/1985 | Hansen | 379/389 |
| 4,613,730 | 9/1986 | Fechalos et al. | 379/355 |
| 4,677,661 | 6/1987 | van Gillawe et al. | 379/389 X |
| 4,796,287 | 1/1989 | Reesor et al. | 379/388 X |
| 4,939,774 | 7/1990 | Sawada | 379/387 X |

Primary Examiner—James L. Dwyer
Assistant Examiner—Magdy W. Shehata
Attorney, Agent, or Firm—Foley & Lardner

[57] ABSTRACT

A single integrated circuit forms a hands-free telephone unit for use in a digital telephone network and in association with an external keypad, an external microprocessor, an external microphone, and an external speaker. The integrated circuit includes a keypad monitor arranged to provide digital key code signals, an audio processor for supporting hands-free operation, and a digital interface to provide a digital interface between the integrated circuit and the digital network and the external microprocessor.

9 Claims, 8 Drawing Sheets

FULLY-INTEGRATED TELEPHONE UNIT

BACKGROUND OF THE INVENTION

The present invention generally relates to a multiple-feature telephone unit wherein the various features are provided by circuitry integrated within a single integrated circuit. The present invention more particularly relates to such an integrated circuit which includes an audio processor, a keypad monitor, a tone ringer control, and a liquid crystal contrast control adapted for use within an Integrated Services Digital Network (ISDN) system and controllable by the microprocessor of the system over a serial bus generally used in such systems.

Multiple-feature telephones are well known in the art. Such telephones are known to include such functions as hands-free or speakerphone operation, multiple-line control, hold, intercom, selectable tone ring, and liquid crystal display. To provide such functions, a multiple-feature telephone unit requires an audio processor adapted to be coupled to a speaker and a microphone, a keypad monitor for enabling the activation of the various features selected on a keypad, a tone ringer and control for producing any one of a plurality of ringing tones, and a contrast control circuit for adjusting the contrast of the liquid crystal display.

Multiple-feature telephones incorporating some or all of the above features are also known for use in digital telephone network systems such as Integrated Services Digital Network (ISDN) systems. However, such known multiple-feature telephone units are relatively expensive because they include many discrete components. Also, these prior art telephone units are not readily adapted for being added to an existing ISDN system not having such features.

The present invention overcomes these deficiencies by providing a single integrated circuit which includes all of the circuitry necessary for a multiple-feature telephone unit. Because all of the circuitry is incorporated onto a single integrated circuit, a telephone unit embodying the present invention is less expensive than prior units. Further, the integrated circuit includes a digital interface for supporting a serial bus typically used in ISDN systems and, hence, is fully compatible therewith.

SUMMARY OF THE INVENTION

The present invention provides an integrated circuit forming a hands-free telephone unit for use in a digital telephone network and in association with an external keypad of the type having a plurality of depressible key switches, an external microprocessor, an external microphone, and an external speaker. The integrated circuit includes keypad monitoring means arranged to be coupled to the external keypad for providing digital key code signals corresponding to the depression of said depressible key switches and audio processing means arranged to be coupled to the external microphone for converting outgoing analog voltages from the microphone representative of human speech to outgoing digital signals representative of human speech and arranged for converting incoming digital signals from the network representative of human speech to incoming analog voltages representative of human speech and arranged to be coupled to the external speaker for providing the speaker with incoming analog voltages. The integrated circuit further includes digital interface means coupled to the audio processing means and the keypad monitoring means and arranged to be coupled to the digital network and the external microprocessor for conveying the incoming digital signals from the network to the audio processing means, the outgoing digital signals to the network, and the digital key code signals to the microprocessor.

BRIEF DESCRIPTION OF THE DRAWINGS

The features of the present invention which are believed to be novel are set forth with particularity in the appended claims. The invention, together with further objects and advantages thereof, may best be understood by making reference to the following description taken in conjunction with the accompanying drawings in the several figures of which like reference numerals identify identical elements and wherein:

DESCRIPTION OF THE PREFERRED EMBODIMENT

Figure 1:
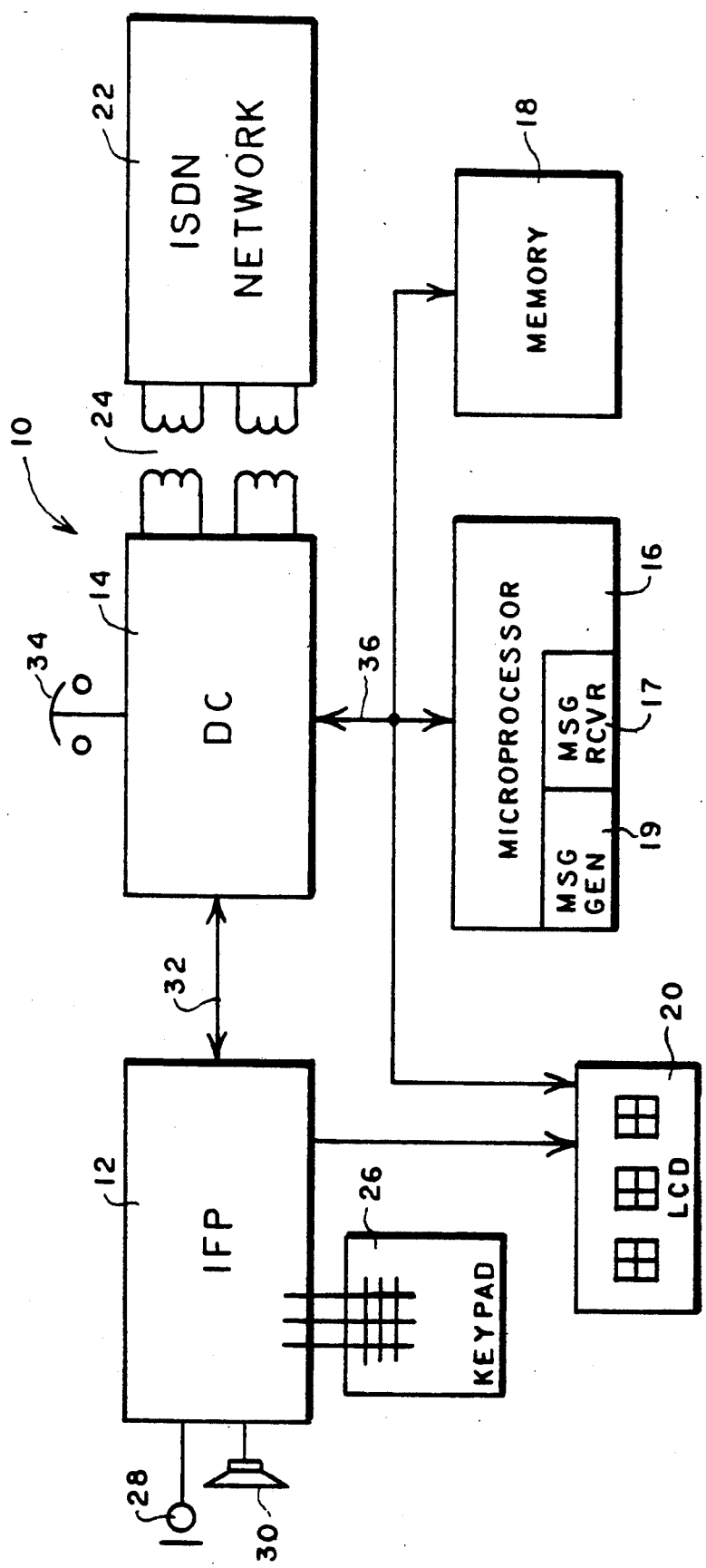
FIG. 1 is a block diagram of an ISDN telephone system including an ISDN hands-free, multiple feature telephone unit embodying the present invention.

Referring now to FIG. 1, it illustrates in block diagram form, an ISDN telephone system 10 embodying the present invention. The system 10 generally includes a hands-free, multiple-feature telephone unit 12 embodying the present invention, a digital controller 14, a microprocessor 16, a memory 18, and a liquid crystal display unit 20. The system 10 is transformer-coupled to an ISDN network 22 by a transformer 24. In accordance with the present invention, the telephone unit 12 is formed in a single integrated circuit.

The telephone unit 12 is coupled to a keypad 26 in a manner to be described in greater detail hereinafter. To that end, as will also be seen hereinafter, the unit 12 includes a keypad monitor for monitoring the keypad and identifying a particular key being depressed. Depression of the keys of the keypad 26 may be made for dialing a telephone number or for activating or deactivating particular features of the telephone unit 12. Also coupled to the unit 12 is a microphone 28 which serves to convert audible speech to analog voltage form and a loudspeaker 30 which serves to convert analog voltages representative of human speech to audible sound. The microphone 28 and speaker 30 may, of course, be contained in the same housing as the telephone unit 12. As will also be seen hereinafter, the telephone unit 12 includes an audio processor which converts the analog voltages produced by the microphone 28 representative of audible speech to output digital signals and which also converts input digital signals representative of human speech to analog voltages for conversion to audible sound by the speaker 30.

As will also be seen hereinafter, the telephone unit 12 further includes a plurality of registers for storing bits of data. Each of the registers is assigned a unique seven-bit address. These addresses are utilized for permitting the microprocessor 16 to access selected registers for writing data into the registers or reading data from the registers. As will be further seen hereinafter, the telephone unit (IFP) 12 is also assigned a unique four-bit address which is utilized in all messages sent between the microprocessor 16 and the telephone unit 12.

The telephone unit 12 is coupled to the digital controller 14 by a four-conductor bus 32. The bus 32 is preferably of the type well known in the art as an IOM-2 bus (IOM is a trademark of Siemens AG). The bus will be described in greater detail with respect to FIG. 2. It basically provides a full-duplex serial digital communication link between the telephone unit 12 and the digital controller 14.

The digital controller 14 provides a digital interface between the telephone unit 12 and the bus 32 to the ISDN network 22 and the microprocessor 16. The digital controller is preferably the Am79C30A Digital Subscriber Controller available from Advanced Micro Devices, Inc., the assignee of the present invention, and is well known in the art. It provides, in addition to the digital interface function, a CODEC transceiver function to support the use of a standard telephone handset 34 coupled thereto to enable the telephone user to communicate over the ISDN network 22 from the standard handset 34.

The liquid crystal display unit 20 is coupled to the telephone unit 12 and the digital controller 14. It functions to provide a display of, for example, a telephone number being dialed, the telephone number of an incoming call or an indication of various telephone unit features selected by the user such as hands-free, hold, speaker mute, et cetera.

The microprocessor 16 is coupled to the digital controller 14 over a microprocessor bus 36 which also couples the microprocessor to the memory 18 and the liquid crystal display unit 20. The microprocessor 16 executes programs stored in the memory 18 and thus provides the intelligence of the system 10. The microprocessor 16 allows the telephone system 10 to perform the functions customarily performed by such systems. It also responds to requests for service by the telephone user when the telephone user takes the telephone handset 34 off-hook or activates the telephone unit 12 by depressing one of the keys of the keypad 26. Such microprocessors and the programs which they execute are also well known in the art.

The microprocessor 16 further includes a message receiver 17 and a message generator 19 to permit the microprocessor to communicate with the telephone unit 12 over the microprocessor bus 36 through the digital controller 14, and over the serial bus 32. The message receiver 17 is arranged to receive error and interrupt messages from the telephone unit 12. Messages sent by the telephone unit 12 are multiple-bit messages with the individual bits thereof placed onto the bus 32 in series within a predetermined channel referred to in the art as the "monitor channel" of the IOM-2 bus. The digital controller converts the serial bits to a parallel-bit format and conveys the parallel bits over the bus 36 to the message receiver 17 of the microprocessor 16.

The message generator 19 is arranged to generate register access messages for accessing selected ones of the registers within the telephone unit 12. The register access messages are multiple-byte messages with the bits of each byte being generated in parallel by the message generator 19. The parallel bit bytes are conveyed over the bus 36 to the digital controller 14 which then converts the parallel-bit bytes to serial-bit bytes and transmits the multiple-bit bytes in series over the bus 32 within the predetermined (monitor) channel. A format control within the telephone unit 12 then reconverts the serial-bit bytes to parallel-bit bytes for processing in a manner to be described hereinafter with respect to FIG. 8.

The register access messages generated by the message generator 19 can take two different forms. The first is a register write message and the second is a register read message. The formats of the register write and register read messages are illustrated below in Tables 1 and 2 respectively wherein the data is received lowest order byte, most significant bit first.

TABLE 1

| Register Write Message Format | | |
|---|---|---|
| Byte | MSB...LSB | Description |
| 0 | 1011 0000 | 1011 = IFP address, 0000 = register access code |
| 1 | 0 \| ADDR | Bit 7 specifies a read (1) or write (0), bits 6-0 = internal register address |
| 2 | DATA 0 | Data to be written into the register {first (least significant) byte} |
| 3,... N-1 | — | Intermediate data bytes of multiple byte access |
| N | DATA N | Last byte of a multiple byte access (most significant byte) |

TABLE 2

| Register Read Message Format | | |
|---|---|---|
| Byte | MSB...LSB | Description |
| 0 | 1011 0000 | 1011 = IFP address, 0000 = register access code |
| 1 | 1 \| ADDR | Bit 7 specifies a read (1) or write (0), bits 6-0 = internal register address |

As can thus be seen from the above, each register access message generated by the message generator 19 includes first and second multiple-bit bytes. The first byte includes a first number of four bits containing the multiple-bit address of the telephone unit 12 and a second number of four bits (0000) identifying the message as a register access message. The second byte includes a single bit identifying the message as a register read (1) or a register write (0) message and a third plurality of seven bits define the multiple-bit address of the register being accessed. The first two bytes of a register write message are immediately followed by a data message including one or more bytes of data to be written into the selected register. The first two bytes of a register read message are followed by a read response message from the telephone unit 12 in a manner to be described subsequently.

Figure 2:
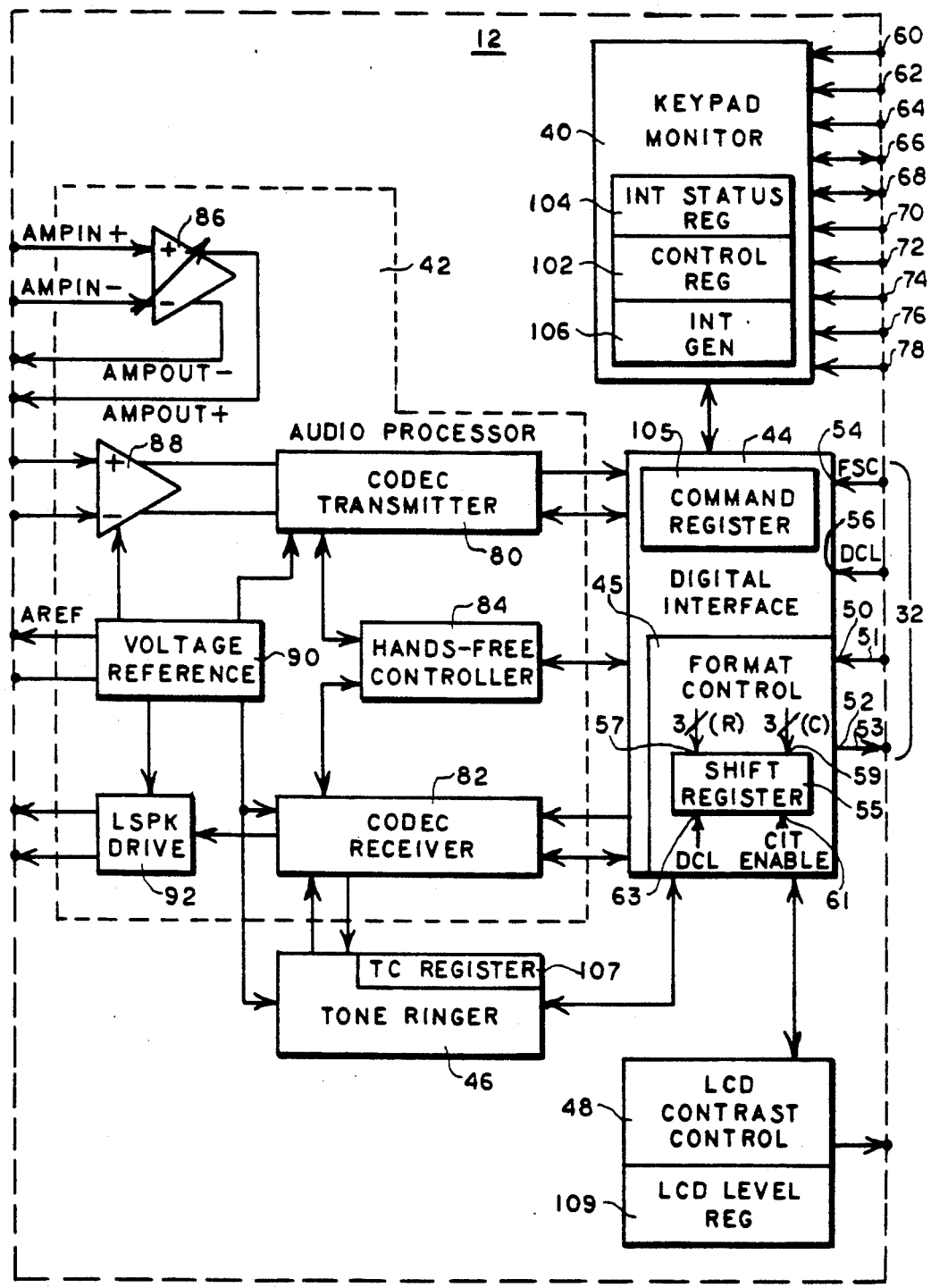
FIG. 2 is a block diagram of the hands-free, multiple feature telephone unit of FIG. 1 embodying the present invention.

Referring now to FIG. 2, it illustrates the telephone unit 12 in greater detail. The telephone unit 12 generally includes the keypad monitor 40, an audio processor 42, a digital interface 44, a tone ringer 46, and a liquid crystal display contrast control 48. The functional units of the telephone unit 12 are all integrated into a single integrated circuit chip to form the telephone unit 12.

The telephone unit 12 further includes the aforementioned plurality of registers to which the microprocessor is afforded access. These registers include a control register 102 and an interrupt status register 104 within the keypad monitor 40, a command register 105 within the digital interface 44, a tone control register 107 within the tone ringer 46/ and a liquid crystal display level register 109 within the liquid crystal display contrast control 48. In a practical implementation of the telephone unit 12, additional registers may be provided including one or more registers within the audio processor 42. It is to be understood, therefore, that the registers illustrated are shown only for purposes of illustrating a preferred embodiment of the present invention.

The control register 102 is preferably an eight-bit register which is used to program the keypad monitor scan debounce time, to select an operating mode of the keypad monitor in a manner to be described hereinafter, and to control general purpose outputs in a manner also to be described hereinafter. Bit 7 of this register, when set, places the keypad monitor into an input/output mode which reduces the size of the keypad to be scanned for converting the use of two of the keypad monitor pins to output pins and two of the keypad monitor pins to input pins. This condition also enables the keypad monitor interrupt generator 106. When bit 7 of the control register is cleared, the keypad monitor 40 is arranged to monitor a full sized keypad. In this mode, the interrupt generator 106 is disabled. Bit 6 is reserved and is therefore written as a "0".

Bits 5 and 4 of the control register 102 program the keypad monitored debounce delay time during depression of a keypad switch and then again during release. Bit 3 of the control register 102 when set along with the mode select bit (bit 7), cause an interrupt message to be generated when an interrupt condition is detected at one of the general input keypad monitor pins. Similarly, when bit 2 of the control register is set along with the mode select bit (bit 7), another interrupt is generated in response to the detection of a change in the state of the other general input pin in detecting interrupt condition. The general input pins when the keypad monitor 40 is rendered in the input/output mode by the setting of the mode select bit are input pins 76 and 78.

When either of bits 1 or 0 of the control register 102 is set and the mode select bit is set, the corresponding output pin 68 or 66 respectively is forced to a high logic level. When either of these bits is cleared, its corresponding output pin is forced to a low logic level.

The interrupt status register 104 is also an eight-bit register which may be read by the microprocessor 16 to determine the state of the general purpose input pins 76 and 78. The register contents are valid only when the keypad monitor 40 is in the input/output mode. Bits 7 through 2 of the interrupt status register are not used and preferably written as zeros. Bits 1 and 0 of the interrupt status register reflect the current status of the general purpose input pins 76 and 78. Either bit is set if its corresponding input pin is at a high logic level and cleared if its corresponding input pin is at a low logic level.

The interrupt generator 106 is provided to generate a two-bit parallel code responsive to an interrupt condition being detected. More specifically, when the keypad monitor is rendered in the input/output mode, the second bit of the interrupt code will be a logical one when a change of state is detected at input pin 76 and the first bit will be a logical one if a change of state is detected at input pin 78.

The command register 105 of the format control 44 is used to control and enable various features of the telephone unit 12. It also is an eight-bit register. Bits 7 through 5 are used for a revision code which are read only. These bits are used for reading back the device hardware revision code of 000. This field must be written as zeros. Bit 4 of the command register 105 when set, returns the internal registers of the telephone unit 12 to their default values within a predetermined period of time. The software reset operation automatically clears this bit. Bit 3 of the command register 105 is used to enable the liquid crystal display contrast control 48. When bit 3 is set, the liquid crystal display contrast control is enable. When bit 3 is cleared, the liquid crystal display contrast control 48 is disabled. Bit 2 of the command register 105 is used to enable the keypad monitor 40. When bit 2 is set, the keypad monitor is enabled. When bit 2 is cleared, the keypad monitor is disabled. Bit 1 of the command register 105 is used to enable the tone ringer 46. When bit 1 is set, the tone ringer is enabled. When bit 1 is cleared, the tone ringer is disabled. Lastly, bit 0 of the command register 105 enables the audio processor 42. When bit 0 is set, the audio processor is enabled, and when cleared, the audio processor is disabled.

The tone control register 107 of the tone ringer 46 is an eight-bit register. Bits 7 through 3 are used to select the warble rate, bit 2 is reserved and is preferably written to zero 0, and bits 1 and 0 are used to select the tone ringer sequence.

Lastly, the liquid crystal display level register 109 of the liquid crystal display contrast control 48 controls the output voltage of the liquid crystal display driver. It also is an eight-bit register with bits 7 through 4 reserved and preferably written as zeros and bits 3 through 0 being used to select an active tap on a resistive divider network for selecting the liquid crystal display driver output voltage.

The digital interface 44 includes a format control 45 which provides a serial digital interface between the functional modules of the telephone unit 12 and the digital controller 14 over the four-conductor bus 32. It therefore is arranged to convert outgoing parallel bits to outgoing serial bits and places the outgoing serial bits within a predetermined channel of the bus 32. It also is arranged for extracting incoming serial bits from the predetermined channel of bus 32 and converting the incoming serial bits to parallel bits for processing within the telephone unit 12. As previously mentioned, the predetermined channel for messages is the IOM-2 monitor channel. The format control 45 includes an input 50 coupled to bus conductor 51 for receiving serial digital data from the digital controller 14 and an output 52 coupled to bus conductor 53 for conveying serial digital data to the digital controller 14. The signals carried on the incoming bus conductor 51 and outgoing bus conductor 53 are multiplexed with the same channel structure comprising three repetitively conveyed thirty-two bit subframes. The frame structure is well known in the art. Each frame comprises a plurality of channels which include serial digital representations of received or transmitted speech, data to be entered into register, data to be read from register, register addresses, keypad information such as a six-bit indication of a particular key being depressed, and other control information.

To provide synchronization for the data transfer, the digital interface 44 includes an input 54 (FSC) for receiving frame synchronizing signals at an 8 kilohertz rate from the digital controller 44 and an input 56 (DCL) for receiving clock signals at a 1.536 megahertz rate from the digital controller 14 for synchronizing the transmission and the reception of the individual bits of data and for causing the keypad monitor 40 to scan its inputs to identify a closed keypad switch.

In keeping with strict power requirements for such telephone units when not in use, the telephone unit 12 is in a deactivated state when not in use for conserving power. When no data is being transferred between the telephone unit 12 and the digital controller 14 or when the telephone unit 12 is deactivated, the data output 52 is held high. The telephone unit 12 detects when a keypad switch of the keypad is depressed or closed causing the keypad monitor 40 to provide an any key down indication. This causes the data output 52 to be pulled low to in turn cause the digital controller 14 to provide the aforementioned clock signals. Upon receipt of the clock signals, the telephone unit 12 is activated permitting the keypad monitor to scan its input terminals to determine which key is depressed.

The keypad monitor 40 includes a first plurality of inputs coupled to input terminal pins 60, 62, 64, 66 and 68 which are arranged to be coupled to a first plurality of keypad switch conductors (row conductors) and a second plurality of inputs coupled to input terminal pins 70, 72, 74, 76 and 78 which are arranged to be coupled to a second plurality of keypad switch conductors (column conductors). Since there are five inputs for row conductors and five inputs for column conductors, the keypad monitor, when operative in a first or full keypad monitor mode, is capable of monitoring all of the input terminals and thus, is capable of monitoring a full-sized keypad comprising twenty-five keypad switches.

When the keypad monitor 40 is operative in a second or input/output mode, the keypad monitor monitors input terminals 60, 62, 64, 70, 72 and 74. Hence, in the input/output mode, there are three row inputs and three column inputs for monitoring a keypad comprising nine keypad switches. Also, and as previously mentioned, when the keypad monitor is in the input/output mode, terminal pins 66 and 68 are converted to general inputs, also not associated with keypad monitoring. As a result, when in the second mode, a third set of terminal pins comprising terminal pins 66, 68, 76 and 78 are not needed for keypad monitoring but are converted to other uses to make full utilization of all of the integrated circuit terminal pins.

Each keypad switch is coupled between a respective different pair of row and column conductors. When a keypad switch is depressed or closed, the keypad monitor 40, after providing the aforementioned any key down indication and receiving the clock signals from the digital controller 14, then scans the input terminals and senses for a condition which indicates which keypad switch is closed. After detecting which keypad switch is closed, the monitor pauses to account for key bounce and then in accordance with the present invention, generates a parallel three-bit row address and a parallel three-bit column address representative of the keypad switch which is closed. The row and column addresses are then conveyed to a parallel input-serial output shift register 55 of the format control 45.

The parallel three-bit row address is impressed upon input 57 of the shift register 55 and the parallel three-bit column address is impressed upon input 59 of the shift register 55. The parallel three-bit addresses at inputs 57 and 59 are then combined by the shift register 55 to form a complete and unique six-bit address for the keypad switch being selected. The address remains in the shift register 55 until an enable signal is received by the shift register at an enable input 61.

In accordance with this preferred embodiment, the six-bit address is conveyed to the digital controller 14 within the C/I channel of the IOM-2 multiplexed bus 32. The shift register 55 converts the parallel six-bit key code into serial bits of data and places the serial bits of data from output 52 onto the bus within the C/I channel upon receipt of the C/I enable signal generated by the digital interface in a known manner. Upon receiving the C/I enable signal, the shift register 55 clocks each address bit one at a time onto the bus synchronized to the DCL clock signals received at input 63.

As will be seen hereinafter, the keypad monitor 40 includes a state control which sequences the keypad monitor through repetitive cycles of operation when the keypad monitor is activated. During the next keypad monitor cycle, if the same key is still depressed, the shift register 55 will once again receive the same three-bit row and column addresses. However, if no key is depressed, the shift register will receive a predetermined parallel six-bit key code (three bits at input 57 and three bits at input 59) representative of a no key down condition to be conveyed over the bus in the C/I channel. The no key down code is the idle code for the C/I channel and is preferably in the form of 111111.

As will be seen hereinafter, the state control of the keypad monitor 40 is also responsive to two or more keypad keys being simultaneously depressed to generate an error signal. The error signal is conveyed to the shift register 55 as a keycode comprising a predetermined parallel six-bit error key code. The error key code is shifted in series onto the bus within the C/I channel upon receipt of the C/I enable signal. The error key code informs the rest of the system that the keypad entry is an invalid entry and should be ignored.

The audio processor 42 includes a CODEC transmitter 80, a CODEC receiver 82, a hands-free controller 84, a variable gain amplifier 86, a fixed gain amplifier 88, a voltage reference 90, and a loudspeaker drive 92. The audio processor 42 thus provides all of the audio processing within the telephone unit 12.

The CODEC transmitter 80 receives analog voltages representative of audible speech from the fixed gain amplifier 88. The fixed gain amplifier 88 includes a pair of inputs which may be directly coupled to an external microphone or coupled to the external microphone through the variable gain amplifier 86. Preferably, the microphone is capacitively coupled to the telephone unit 12 at the inputs of either the variable gain amplifier 86 or the fixed gain amplifier 88. If the variable gain amplifier 86 is utilized, its outputs should preferably be capacitively coupled to the inputs of the fixed gain amplifier 88 through external capacitors.

The CODEC transmitter 80 after receiving the audio voltages representative of human speech, digitizes the analog voltages into an 8-bit digital word and conveys the same to the format control 45. The format control 45 then serializes the digital word received from the CODEC transmitter and places the same into the appropriate channel for transmission to the digital controller from the output 52.

The CODEC receiver 82 includes a digital-to-analog converter which converts the 8-bit digital words received from the format control 45 representative of received human speech and converts the same to analog voltages. The received audio is received by the format control 45 at input 50 in serial bit format and converts the same to 8-bit parallel bit words for conversion to analog form by the CODEC receiver 82. The CODEC receiver 82 is coupled to the loudspeaker drive 92 which includes an amplifier for amplifying the analog voltages representative of received human speech. The loudspeaker drive 92 is adapted to be coupled to the external speaker 30 (FIG. 1) for reproducing the received audio.

The tone ringer 46 is coupled to the CODEC receiver 82. The tone ringer provides ringing tones in digital format which are also converted to analog form by the CODEC receiver. The analog voltages representative of the ringing tones are then conveyed to the loudspeaker drive 92 for reproduction by the external speaker coupled to the loudspeaker drive 92. The tone ringer 46 is preferably programmable by the register 107 contained within the tone ringer 46 to permit a plurality of different distinguishable rings to be produced. The bits of the register 107 may be set by the microprocessor.

Lastly, the liquid crystal display contrast control 48 provides an output voltage for the liquid crystal display 40 to adjust the contrast thereof. The liquid crystal display contrast control 48 is coupled to the digital interface 44 and is controllable by the register 109, as previously explained, which may be programmed to provide a desired output voltage.

The hands-free controller 84 is coupled between the CODEC transmitter 80 and CODEC receiver 82. The hands-free controller 84 controls the enablement of the CODEC transformer and CODEC receiver to provide hands-free simplex operation of the telephone unit 12. The hands-free controller 84 is coupled to the digital interface 44 for receiving control signals therefrom.

Figure 3:
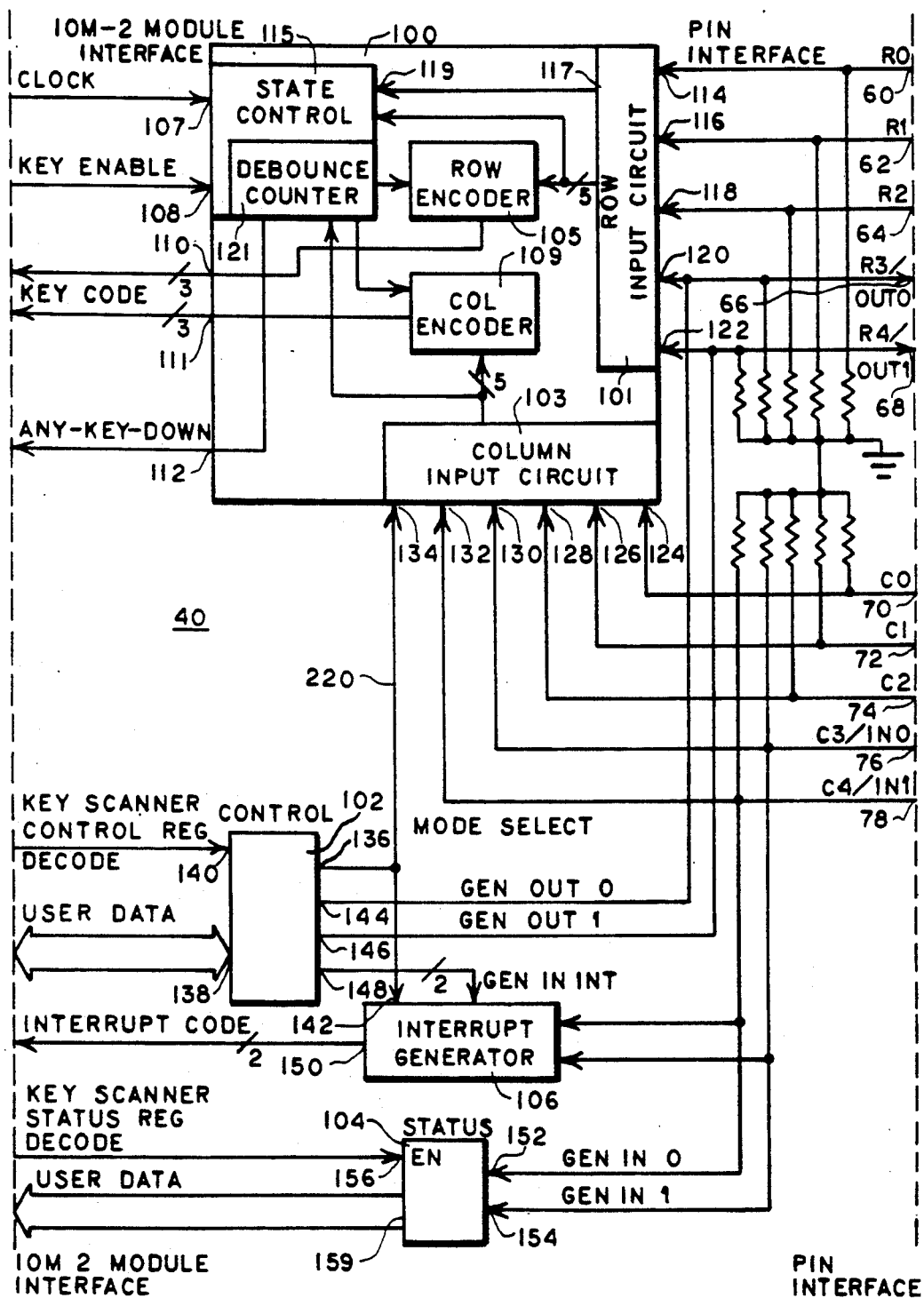
FIG. 3 is a block diagram of the keypad monitor of the hands-free, multiple feature telephone unit of FIG. 2.

Referring now to FIG. 3, it illustrates the keypad monitor 40 in greater detail. The keypad monitor 40 generally includes monitor section 100, the control register 102, the status register 104, and the interrupt message generator 106.

The monitor section 100 includes a clock input 107 for receiving the DCL clock signals from the digital interface 44, a key monitor enable input 108 for receiving enable signals from the digital interface 44, outputs 110 and 111 for providing the shift register 55 of the digital interface 44 with the parallel three-bit row and column key codes respectively representing the keypad switch being closed and the predetermined six-bit error key code, and output 112 for providing the digital interface 44 with the aforementioned any key down indication.

The monitor section further includes a row input circuit 101, a column input circuit 103, a row encoder 105, a column encoder 109, and the state control 115. Lastly, the monitor section includes an input 134 which is coupled to the output 136 of the control register 102 which controls whether the keypad monitor 40 is in the first or second mode of operation.

The row input circuit 101 includes the first plurality of inputs 114, 116, 118, 120, and 122 which are coupled to terminal input pins 60, 62, 64, 66, and 68 respectively. Similarly, the column input circuit 103 includes the second plurality of inputs 124, 126, 128, 130, and 132 which are coupled to the input terminal pins 70, 72, 74, 76, and 78, respectively.

Before a depressed keypad switch may be identified with the six-bit key code, it is first necessary to activate the keypad monitor 40 and digital interface 44 through the generation of the any key down signal. To that end, the row input circuit 101 detects when any one of the keypad switches has closed to generate an output signal at an output 117 which is used in the generation of the any key down signal. The output 117 is coupled to an input 119 of the state control 115. The state control includes a clock detector (not shown) which is coupled to the input 107 of the monitor section to detect the presence and absence of the clock signals. In the absence of the clock signals, and in response to receiving the output signal from output 117 of the row input circuit 101, the state control 115 provides the any key down signal at output 112. As a result, the state control 115 generates the any key down signal at its output 112 when any one of the keypad switches is closed together with the absence of clock signals being received at input 107. The any key down signal provided at output 112 then causes the output 52 of the digital interface 44 to be pulled low momentarily to cause the digital controller to provide the clock signals.

The clock signals provided by the digital controller 14 cause the digital interface 44 to be activated and also cause the state control 115 to enable the row and column encoders to scan their inputs to identify which one of the keypad keys is closed. To that end, the row input circuit 101 includes five outputs which are coupled to the row encoder 105 and the state control 115. Each of these outputs corresponds to a respective given one of the row conductors which are coupled to the keypad switches. The row input circuit 101 generates a first signal at those outputs which have corresponding row conductors coupled to a depressed keypad switch. Similarly, the column input circuit 103 includes five outputs which are coupled to the column encoder 109 and to the state control 115. Each of these outputs corresponds to a respective given one of the column conductors coupled to the keypad switches. The column input circuit 103 is arranged to generate a second signal at those outputs which have corresponding column conductors coupled to a closed keypad switch.

When enabled by the state control 115, the row encoder 105 and column encoder 109 scan their inputs for the first and second signals respectively. The row encoder responsive to a first signal at one of its inputs will generate the parallel three-bit row address for the corresponding row conductor which is coupled to the closed keypad switch. Similarly, the column encoder 109 upon detecting the second signal at one of its inputs, will generate the parallel three-bit column address for the column conductor which is coupled to the closed keypad switch. The parallel three-bit row and column addresses are conveyed to the outputs 110 and 111 respectively of the monitor section 100 and are conveyed in parallel to the shift register 55 of the format control 4 (FIG. 2) as previously described.

If two or more keypad switches are simultaneously depressed the state control 115 will detect the presence of more than one first signal from the row input circuit or more than one second signal from the column input circuit to generate the error key code over outputs 110 and 111 of the monitor section 100. In addition to generating the error key code, the state control 115 disables the row encoder 105 and column encoder 109 to preclude the generation of a parallel three-bit row and column address by the row encoder and the column encoder. The error key code provided at outputs 110 and 111 is conveyed to the shift register 55 of the format control 45 as previously described. As also previously described, when the error key code is conveyed over the serial bus, the rest of the system will be advised that the entry is invalid and should be ignored.

When no key is depressed, and the row encoder and the column encoder are enabled by the state control to provide their respective addresses, the row encoder and column encoder will each provide a predetermined three-bit key code indicating a no key down condition. These parallel three-bit codes are conveyed to the shift register 55 of the format control 45 in the usual manner so as to be combined by the shift register and converted to serial bits of data indicating the no key down condition.

The state control 115 includes a debounce counter 121 which delays the reporting of the status of the keypad for a predetermined period of time after a key is depressed. As will be seen hereinafter, the debounce time period is set by incrementing the debounce counter a predetermined number of times prior to reporting the status of the keypad.

The control register 102 includes an input 138 for reading control data from or writing control data into the register 102. The control register includes another input 140 for receiving the seven-bit address of the control register to enable the control register to be properly programmed to set the keypad monitor into the full or input/output mode of operation. For example, when the first mode of operation is selected, the output 136 will provide a high level to input 134 of the keypad monitor logic and a high level to an input 142 of the interrupt generator 106. When the keypad monitor is to operate in the input/output mode, the control register 102 will provide at output 136 a low level to input 134 of the keypad monitor logic and to the input 142 of the interrupt generator 106.

The control register 102 includes another output 144 coupled to input 120 of the keypad monitor logic and an output 146 coupled to input 122 of the keypad monitor logic. These outputs, when the keypad monitor is operative in the input/output mode, provide a high logic level to the inputs 120 and 122 when these outputs are used for general outputs and thus enable the control register to be properly programmed to set the keypad monitor into the first or second mode of operation. For example, when the first mode of operation is selected, the output 136 will provide a high level to input 134 of the monitor section and a high level to an input 142 of the interrupt generator 106. When the keypad monitor is to operate in the second mode, the control register 102 will provide at output 136 a low level to input 134 of the monitor section and to the input 142 of the interrupt generator 106.

The control register includes a further output 148 which is coupled to the interrupt generator 106. The output 148 allows the interrupt generator 106 to be enabled when the keypad monitor is in the input/output mode of operation to permit the interrupt generator 106 to generate interrupt messages responsive to the input conditions at pins 76 and 78. If during the input/output mode of operation the input pins 76 and 78 are to be used for purposes other than to generate interrupt messages, the interrupt generator 106 would not be enabled by the output 148. The interrupt generator 106 has an output 150 for providing the two-bit interrupt messages. The output 150 is coupled to the digital interface 44 to cause an eight-bit interrupt message to be conveyed to the digital controller 14 and the microprocessor 16 in a manner to be described hereinafter.

The status register 104 includes a pair of inputs 152 and 154 coupled to input terminals 76 and 78 respectively. The status register 104 also includes an input 156 for receiving its seven-bit address and enabling the status information contained therein to be read as to the condition of pins 76 and 78 over an output 159. The output 159 is coupled to the digital interface 44 so that the status of the status register 104 may be read by the microprocessor 16.

Figure 4:
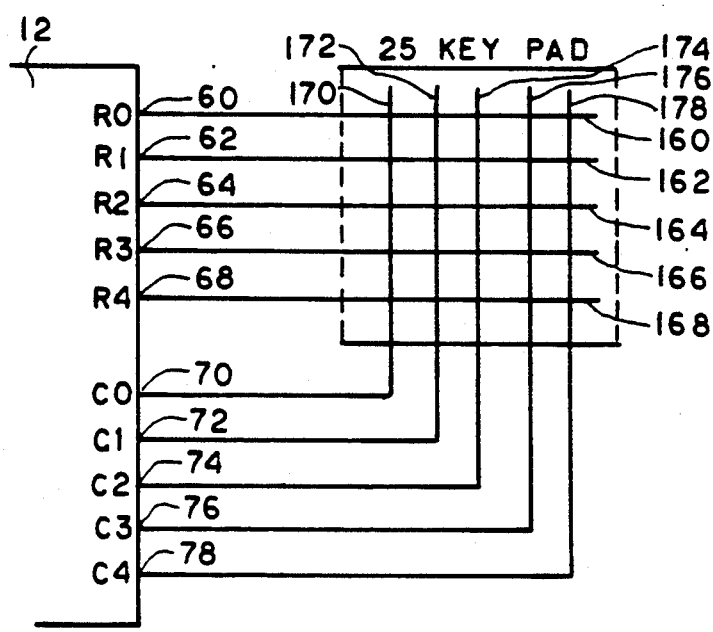
FIG. 4 is a simplified block diagram illustrating the keypad monitor of FIG. 3 when operating in a first mode.

Referring now to FIG. 4, it illustrates the manner in which the keypad monitor of the telephone unit 12 is coupled to a keypad comprising twenty-five keypad switches when operative in the first mode of operation. As will be noted in FIG. 4, each of the row input terminal pins 60, 62, 64, 66, and 68 is coupled to a row conductor 160, 162, 164, 166, and 168 respectively. Similarly, each column terminal input pin 70, 72, 74, 76, and 78 is coupled to a respective one of the column conductors 170, 172, 174, 176, and 178. As configured in this manner, the keypad monitor of the telephone unit 12 is capable of supporting a keypad having twenty-five keypad switches.

Figure 5:
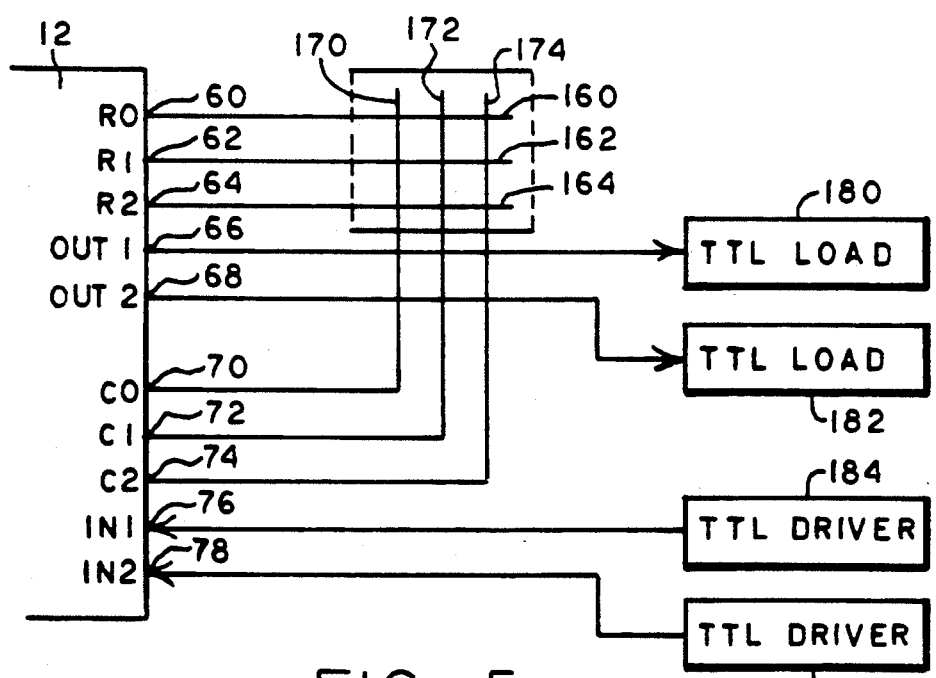
FIG. 5 is a simplified block diagram illustrating the keypad monitor of FIG. 3 when operating in a second mode.

Referring now to FIG. 5, it illustrates the manner in which the keypad monitor of the telephone unit 12 is coupled to a keypad comprising nine keypad switches when operative in the second mode of operation. It will be noted that in FIG. 5, each of the row terminal input pins 60, 62, and 64, is coupled to a respective one of the row conductors 160, 162, and 164. Similarly, each of the column input terminal pins 70, 72, and 74 is coupled to a respective one of the column conductors 170, 172, and 174. The terminal pins 66 and 68 are converted for general output purposes and are coupled to TTL loads 180 and 182. Pins 76 and 78 are coupled to TTL drivers 184 and 186 and thus serve as general purpose input pins. Hence, when the keypad monitor is rendered operative in the second mode, the third set of terminal pins including terminal pins 66 and 68 are converted for general output purposes, and terminal pins 76 and 78 are converted for general input purposes, not associated with the monitoring of the keypad.

Figure 6:
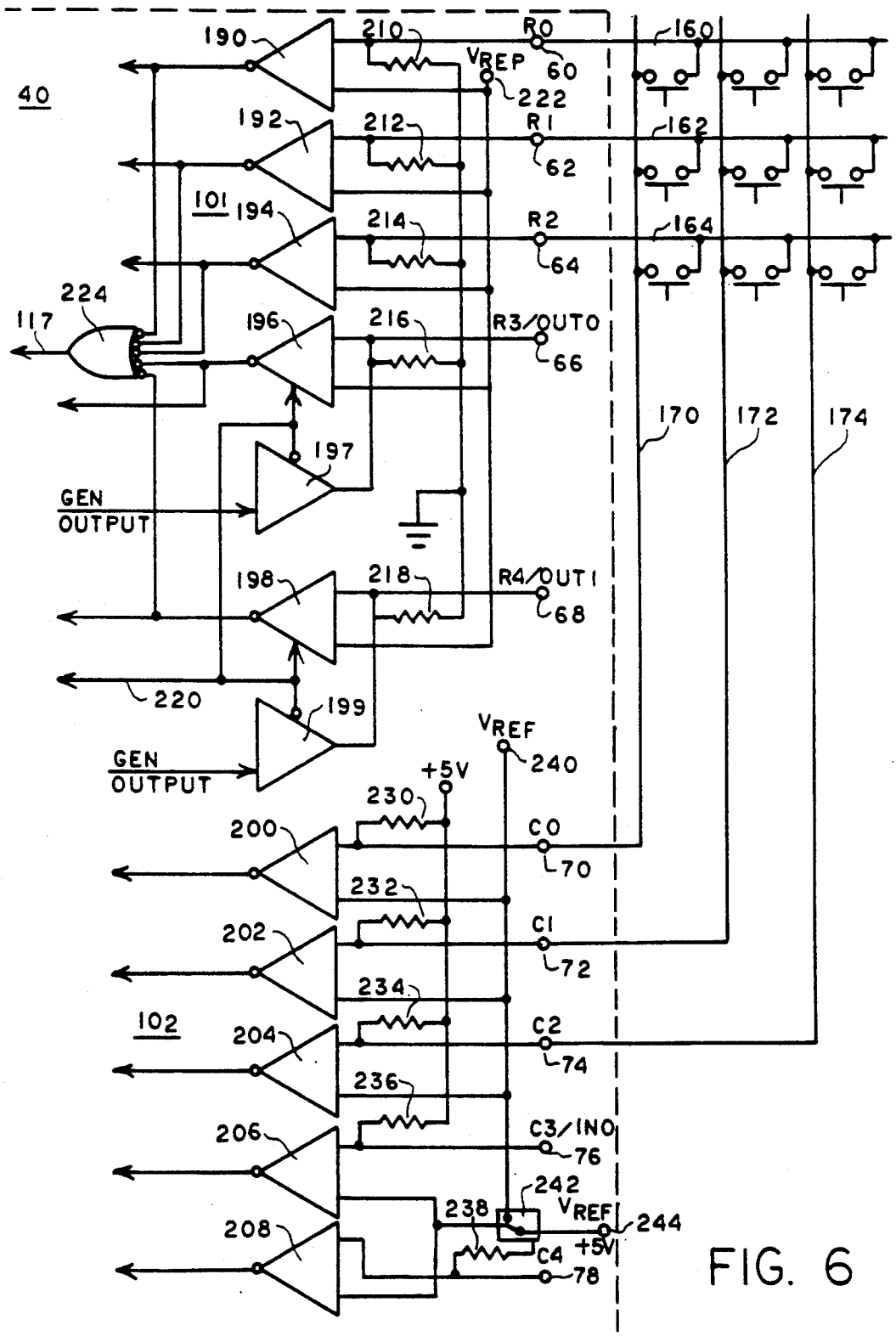
FIG. 6 is a schematic circuit diagram illustrating the circuitry of the keypad monitor of FIG. 3 which may be used for sensing the closure of any one of the keypad switches and providing first and second output signals responsive thereto for use in deriving a multiple-bit keypad switch address for identifying a particular keypad switch being selected.

Referring now to FIG. 6, it illustrates in greater detail the row input circuit 101 and the column input circuit 103. These circuits are illustrated when the keypad monitor is operative in the second mode of operation. The row input circuit 101 includes a plurality of sense amplifiers 190, 192, 194, 196, and 198, and the column input circuit 103 includes sense amplifiers 200, 202, 204, 206, and 208. The sense amplifiers 190, 192, and 194 include a first input coupled to the row conductors 160, 162, and 164 respectively and to ground potential through internal pull down resistors 210, 212, and 214 respectively. Sense amplifiers 196 and 198 also have a first input coupled to terminal pins 66 and 68 respectively and to ground potential through pull down resistors 216 and 218, respectively. In keeping with the second mode, it will be noted, that terminal pins 66 and 68 are not coupled to any row conductors.

Associated with sense amplifiers 196 and 198 are sense amplifiers 197 and 199 respectively. Sense amplifiers 197 and 199 each include an input which is coupled to a general purpose output for receiving a general purpose output signal. When the keypad monitor is rendered in the second mode, a logical zero is impressed upon mode select line 220 which is coupled to the output 136 of the control register 102 (FIG. 3) which disables sense amplifiers 196 and 198 and enables sense amplifiers 197 and 199. As a result, the terminal pins 66 and 68 are converted to general output pins for driving TTL loads 180 and 182 (FIG. 5).

It will also be noted that each of the sense amplifiers 190, 192, 194, 196, and 198 includes a second input which is coupled to a reference voltage at a terminal 222. The reference voltage is selected such that when one of the keypad switches is depressed or closed, a logical one first signal is provided at the output of the sense amplifier coupled to the row of the switch which has been depressed. It will also be noted that the outputs of the sense amplifiers are all coupled to an input of an OR gate 224. Hence, when one of the key switches of the keypad is depressed, OR gate 224 will provide at an output 117 the output signal previously described which is used to generate the any key down signal.

Sense amplifiers 200, 202, and 204 each include a first input which is coupled to one of the keypad column conductors 170, 172, and 174 and to a +5 volts through internal pull up resistors 230, 232, and 234. Sense amplifiers 206 and 208 also include a first input which is coupled to a +5 volts through an internal pull up resistor 236 and 238 and are also coupled to the column input terminal pins 76 and 78 which are not coupled to any column lines. Sense amplifiers 200, 202, and 204 have a second input coupled to a voltage reference at a terminal 240 which is equal to the reference voltage supplied at terminal 222. When a keypad switch is depressed, the sense amplifier coupled to the column line which is in turn coupled to the closed keypad switch will provide a second signal logical one output. A second signal logical one output of one of the column sense amplifiers 200, 202, and 204 and a first signal logical on output provided by one of the row sense amplifiers 190, 192, or 194 are sensed by the encoders 103 and 101 as they scan their inputs to generate their respective parallel three-bit codes indicating which keypad switch is closed. Of course, if the keypad monitor is operative in the first mode, sense amplifiers 196 and 198 would be coupled to two additional row conductors and sense amplifiers 206 and 208 would be coupled to two additional column conductors.

It will also be noted that sense amplifiers 206 and 208 include a second input coupled to a switch 242 which may be a solid state switch. One pole of the switch is coupled to the reference potential terminal 240 and the other pole of the switch is coupled to another reference potential terminal 244. When the keypad monitor is operative in the second mode, the low logic level on the mode select line 220 causes the switch 242 to select the reference potential at terminal 244. By doing so, the second inputs of the sense amplifiers 206 and 208 are coupled to a different reference potential for sensing high or low TTL levels at their respective first inputs coupled to terminals 76 and 78. In this manner, the terminals 76 and 78 are converted for general input purposes and are coupled to TTL drivers 184 and 186 as illustrated in FIG. 5.

Figure 7:
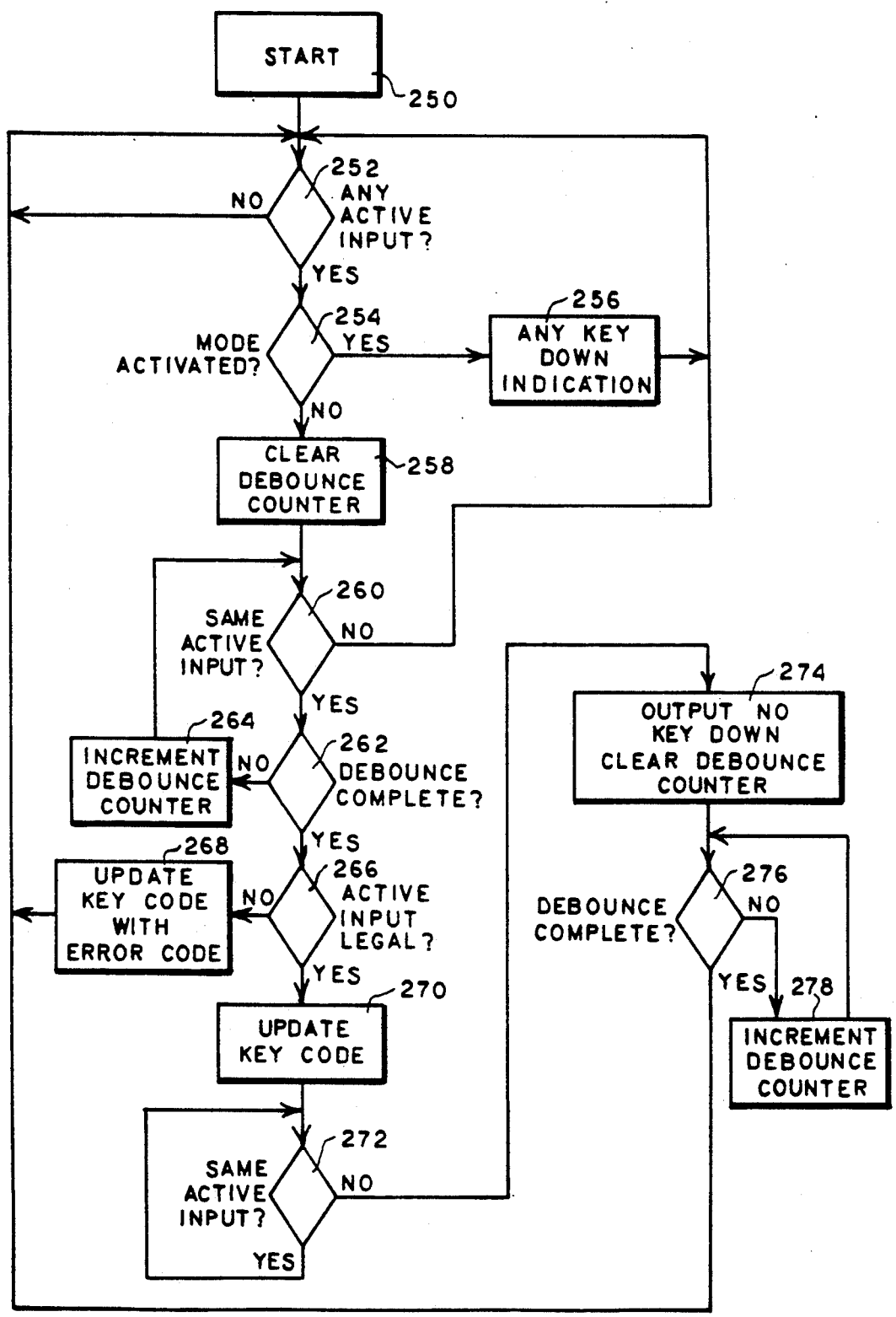
FIG. 7 is a flow diagram illustrating the manner in which the keypad monitor of FIG. 3 may be implemented for monitoring a plurality of keypad switches and reporting the status thereof in accordance with a preferred embodiment.

Referring now to FIG. 7, it illustrates the manner in which the state control 115 may be implemented for controlling the operation of the keypad monitor 40. The keypad monitor begins at start in step 250. It first determines in step 252 if any one of the keypad switches has been depressed. If not, the keypad monitor will return to start. If a keypad switch has been depressed, the keypad monitor then in step 254 determines if it is in the deactivated mode. It performs this step by the clock detector detecting the absence of the clock signals from the digital controller 14. If the keypad monitor is deactivated, then in step 256, it provides the any key down indication to be conveyed to the digital interface 44. This causes the digital controller 14 to provide clock pulses from its clock source 15 to the telephone unit 12 over the bus 32. The digital interface 44 and keypad monitor 40 are then activated and the keypad monitor then returns to start.

If the key is still depressed, the keypad monitor will sense that the key is depressed in step 252, and then determine in step 254 that it is not in the deactivated mode. Since the keypad monitor 40 is now activated, the key switch monitor 101 will now receive clock signals causing the encoders to scan their inputs.

The keypad monitor then clears the debounce counter in step 258. The debounce counter is provided to provide a delay time for the keypad switch being depressed to be stabilized and to dissipate any transients that may be occurring within the keypad.

The keypad monitor then in step 260 determines if the keypad switch currently depressed is the same active input as originally detected. If not, the keypad monitor returns to start. If it is the same active input, the keypad monitor then determines in step 262 if the debounce period has been completed. If not, the keypad monitor in step 264 increments the debounce counter and then returns to step 260. When the debounce counter is incremented a sufficient number of times to indicate that the debounce time period has been completed, the keypad monitor will detect in step 262 that the debounce time period has been completed and then proceeds to step 266 to determine if the active input is a legal input. If the active input is not legal, caused for example by two keys being simultaneously depressed, the keypad monitor, through the state control 115, the updates the keycode with the predetermined error key code in step 268. After providing the error key code, the keypad monitor returns to start.

If the active input is a legal input as determined in step 266, the keypad monitor proceeds to step 270 to enable the encoders 105 and 109 to update the key code. When updating the key code, the keypad monitor provides the six-bit key code of the particular key being depressed by providing the parallel three-bit row and column addresses.

After updating the key code, the keypad monitor then determines if the same key is still being depressed in step 272. The keypad monitor continuously repeats step 272 until the same key is no longer being depressed. When the key is no longer being depressed, the keypad monitor will output a six-bit code indicating that no key is being depressed. This no key down output is a predetermined six-bit code, and will clear the debounce counter in step 274. The keypad monitor then in step 276 determines if the debounce time period has completed. If not, the keypad monitor in step 278 increments the debounce counter and returns to step 276 to determine if the debounce time period has completed. Once the debounce time period has completed, the keypad monitor returns to start to detect the depression of another keypad switch.

Hence, from the foregoing, it can be seen that the keypad monitor provides a six-bit code indicating that no key is down, a six-bit code indicating an error when the input is illegal, a six-bit code indicating which keypad switch is depressed, and a separate indication of an any key down condition to cause the digital controller to provide clock signals to activate the interface 44 and the keypad monitor 40.

After receiving the clock signals from the digital controller 14, the keypad monitor then determines which key is depressed as described above. Before providing the six-bit code indicating the particular key being depressed, the keypad monitor provides a debounce time period and after the keypad switch is opened, the keypad monitor provides another debounce time period. If two keys are being depressed simultaneously, the keypad monitor generates a six-bit error key code to inform the microprocessor 16 that it should disregard the keypad switch closure. Also, when no key is depressed, the keypad monitor provides a six-bit no key down code to the interface 44.

All of the parallel six-bit codes are converted to serial data bits by the format control 45 of the digital interface 44. The serial bits of data are placed into the proper channel when conveyed to the bus 32 for conveyance to the digital controller 14.

Figure 8:
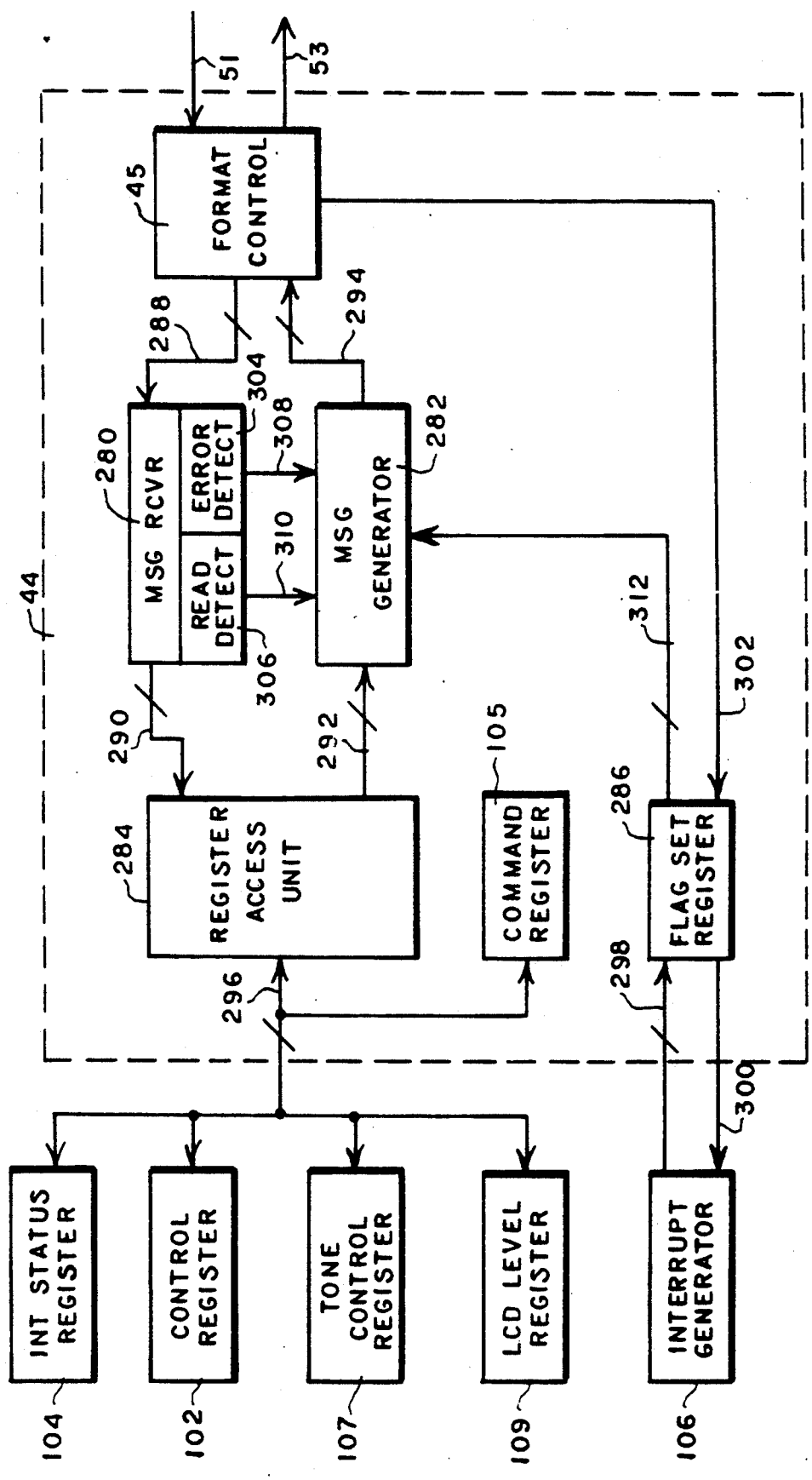
FIG. 8 is a block diagram illustrating a portion of the digital interface 44 of FIG. 2 for permitting the microprocessor access to various registers within the hands-free, multiple feature telephone unit of FIG. 2.

Referring now to FIG. 8, it illustrates the portion of the digital interface 44 which provides the microprocessor 16 access to the various registers which reside within the telephone unit 12. More specifically, FIG. 8 illustrates the interrupt status register 104, control register 102, tone control register 107, liquid crystal display level register 109, and command register 105 which have been previously described.

The digital interface 44 includes the format control 45, a message receiver 280, a message generator 282, a register access unit 284, and a flag set register 286. Also, illustrated in FIG. 4 is the interrupt generator 106 which is coupled to the flag set register 286.

The format control 45 is coupled to the message receiver 280 by an eight-bit parallel bus 288. The message receiver 280 is coupled to the register access unit 284 by another eight-bit parallel bus 290. The register access unit 284 is also coupled to the message generator 282 by a further eight-bit parallel bus 292 and the message generator 282 is coupled to the format control 45 by a still further eight-bit parallel bus 294. For accessing the registers, and to enable the reading of the register contents and writing of data into the registers, the register access unit 284 is coupled to interrupt status register 104, the control register 102, the tone control register 107, the liquid crystal display level register 109, and the command register 105 by a bi-directional eight-bit parallel bus 296. The interrupt generator 106 is coupled to the flag set register 286 by a two-bit parallel bus 298 and by a conductor 300. Lastly, the format control 45 is also coupled to the flag set register 166 by a conductor 302.

The message receiver 160 includes an error detector 304 and a read operation detector 306. As will be described hereinafter, the error detector 304 detects for errors in the register access messages received from the microprocessor and in response to detecting an error in a register access message, causes the message generator 282, by providing a signal over a line 308, to generate an eight-bit error message to be described hereinafter.

The read detector 306 detects if a register access message is a register read message. In doing so, the read detector detects whether bit 7 of the second register access message byte is a 1 or a 0. If it is a 1, the read detector will enable the message generator 282 by providing a signal over a line 310, to format a read response message which is formatted in a manner to be described hereinafter.

When the telephone unit receives a register access message at the format control 45 over the incoming IOM-2 bus monitor channel on bus conductor 51, the format control 45 converts the serial bits of the incoming message to eight-bit parallel bit bytes. As previously described, the incoming messages are in serial bit form with each eight-bit byte being received in successive frames. The first byte includes a first four-bit portion which contains the telephone unit four-bit address, and a second four-bit portion which will contain all zeros indicating that the incoming message is a register access message. The second byte received by the format control will include a single bit (bit 7) which indicates whether the register access message is a register read or a register write. If the message is a register read, the read detector 306 detects a logical one as bit 7 of the second byte and enables the message generator 282 for generating a read response message. The remaining seven bits of the second byte contains the seven-bit address of the register being accessed. The message receiver 280 conveys the seven-bit address of the register to be accessed to the register access unit 284 over the eight-bit parallel bus 290. The register access unit then decodes the seven-bit address of the register to be accessed and provides the register to be accessed with an access signal over the eight-bit parallel bus 296. This enables the register to be accessed for the reading of its contents. The register access unit 284 receives the contents of the accessed register over the bi-directional bus 296 and translates it to the message generator over the eight-bit parallel bus 292. The message generator 292 then generates a read response message which has the format shown below in Table 3.

TABLE 3

| | Register Respond Message Format | |
|---|---|---|
| Byte | MSB...LSB | Description |
| 0 | 1011 0000 | 1011 = IFP address, 0000 = register access code |
| 1 | DATA 0 | Data read from the register (first byte, least significant byte) |
| 2,...<br>N-2 | — | Intermediate data bytes of multiple byte access |
| N | DATA N | Last byte for a multiple byte access (last byte, most significant byte) |

As can be seen from Table 3 above, the read response message includes at least two bytes. The first byte (byte 0) includes a first four-bit portion which contains the four-bit address of the telephone unit, and a second four-bit portion which contains all zeros indicating the read response message is in response to a register access message. The second and succeeding bytes of the read response message contain the data field of the particular register being read. For single byte registers, the data field is one byte long. For multiple byte registers, the data field is as many bytes long as the register is deep. The message generator 282 conveys the read response message bytes to the format control in series with the bits of each read response message byte being in parallel over the eight-bit parallel bus 294. The format control 45 converts the parallel bits of each of the read response message bytes into serial bits and places each of the bytes within the outgoing monitor channel of the IOM-2 bus on the outgoing bus conductor 53. After all of the read response message bytes have been sent in consecutive frames, the message generator will cause, for the next two successive frames, the monitor channel to be idle to indicate to the microprocessor that the read response message has been completed.

If the incoming register access message is a register write message, the read detector 306 will detect a 0 in bit 7 of the second byte of the register write message and will not enable the message generator 282. The seven-bit address of the register to be accessed is conveyed to the message receiver 280 and then to the register access unit 284 over the eight-bit parallel bus 290. The register access unit 284 then decodes the address of the register to be accessed and provides that register with an access signal over the bi-directional eight-bit parallel bus 296, to enable the particular register to be accessed. With the register to be accessed now enabled, the successive data bits of the register write message, which have been converted from serial bit to parallel bit form by the format control 45, are conveyed from the message receiver 280 to the register access unit 284 and then to the particular register which is to receive the data. After the register write message is completed, the microprocessor will cause the incoming monitor channel to be idle for two successive frames to indicate to the format control 45 that the register write message has been completed.

As previously mentioned, the error detector 304 detects errors in the register access messages. When the error detector 304 detects an error in a register access message, it causes the message generator 282 to generate an error message by providing a signal over line 308. The error message is a predetermined eight-bit single byte error message which is conveyed with the bits in parallel to the format control 45. The format control 45 then converts the parallel bits of the error message to serial bits and places these bits in series into the outgoing monitor channel of the IOM-2 bus on the outgoing bus conductor 53.

The error message is generated for anyone of three error conditions. The first condition is when a register write message is received and is not followed by an address and the correct number of data bytes. In this case, the message generator returns the error message in the outgoing monitor channel and causes the format control to go to a reset state in which it looks for the start of the next message. The second condition is when the first byte of a register read message is received and is followed by an end-of-transmission, that is, by two successive frames in which the monitor channel is idle. In this case, the message generator returns the error message and causes the format control to go through the reset state. The third and last condition is when more than two bytes are received in a register read message. In this case, the message generator returns the error message in the outgoing monitor channel of the IOM-2 bus and causes the format control to abort the read operation.

Lastly, as previously described, the interrupt generator 106 detects interrupt conditions at the two input pins of the keypad monitor when the keypad monitor is programmed in the input/output mode. Upon detecting a change of state at one of these input pins, indicating an interrupt condition, the interrupt generator 106 generates a two-bit indication of the interrupt condition and conveys the same to the flag set register over the two-bit parallel bus 298. The two-bit interrupt condition indication indicates at which input pin the interrupt condition was caused. Upon receiving the two-bit interrupt condition indication, the flag set register 286 sets an internal flag and then conveys the two-bit interrupt condition indication to the message generator 282 over the two-bit parallel bus 312. Upon receiving the two-bit interrupt condition indication, the message generator 282 will generate an interrupt message. The interrupt message is preferably a single byte eight-bit message wherein a first four-bit portion contains the four-bit address of the telephone unit and the second four-bit portion indicates the source of the interrupt condition. The indication of the source of the interrupt condition indicates at which keypad monitor input terminal the interrupt condition was caused. Also, although not illustrated, the audio processor may also generate interrupt conditions and the second portion of the interrupt message would then include a four-bit code indicating that the interrupt condition originated within the audio processor. Such an interrupt condition may be caused, for example, by limiter overflows within the audio processor.

The eight-bit single byte interrupt message is then conveyed to the format control 45 over the eight-bit parallel bus 294. The format control 45 then converts the parallel bits to serial bits and places the bits of the single interrupt message byte in series within the monitor channel of the IOM-2 bus on the outgoing bus conductor 53.

Preferably, the microprocessor is arranged to provide an acknowledgement message to acknowledge the receipt of the interrupt message. To this end, the IOM-2 bus includes a single-bit MR channel which is rendered active by the microprocessor in acknowledgment of receiving the interrupt message. The active MR channel is received by the format control 45 from the incoming bus conductor 51 and conveys the same to the flag set register 286 which then clears its interrupt flag. The flag set register 286, over line 300, then causes the interrupt acknowledgment to be conveyed to the interrupt generator to cause the interrupt generator to reset.

Figure 9:
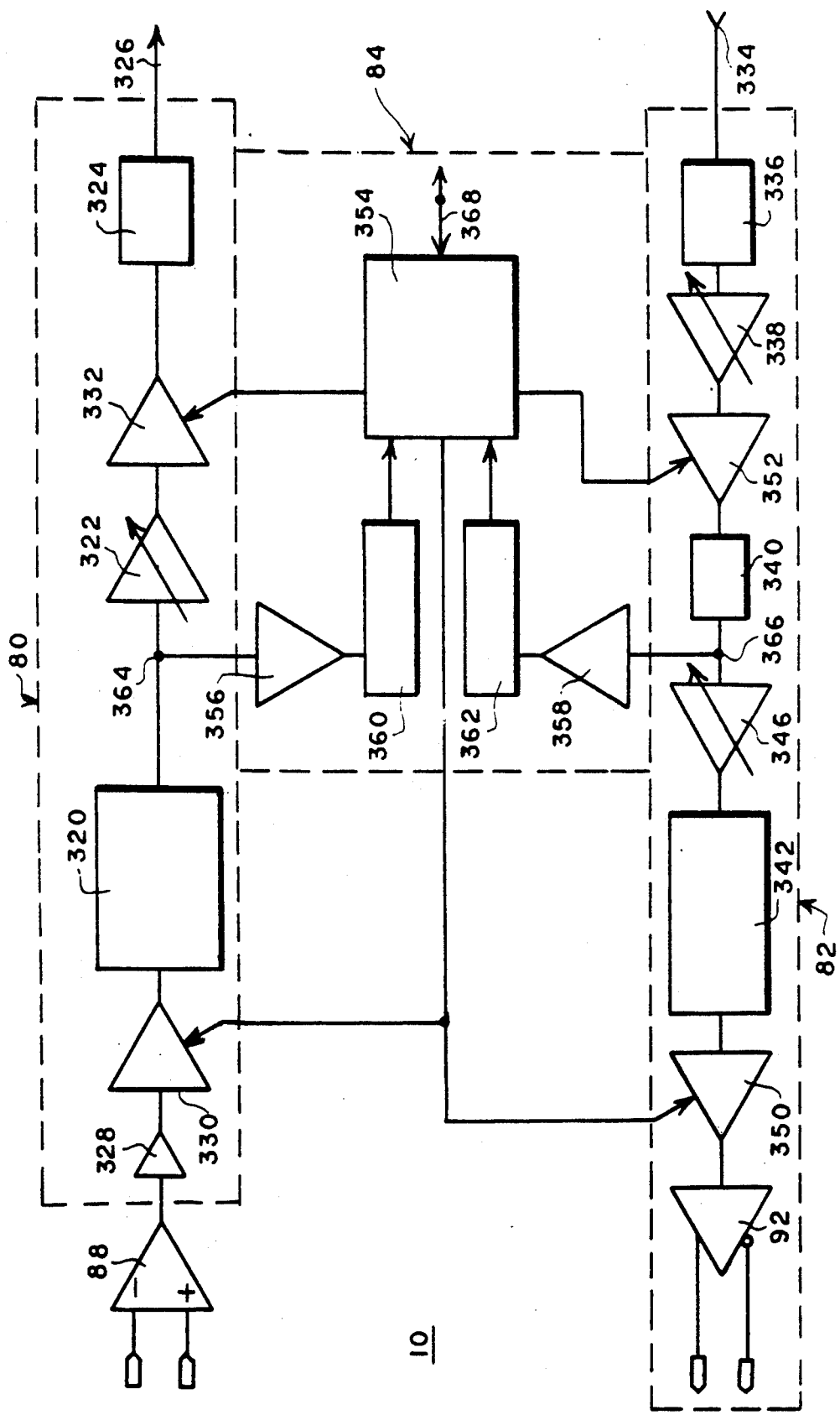
FIG. 9 is a more detailed diagram of the audio processor of FIG. 2.

Referring now to FIG. 9, it illustrates in greater detail the transmitter 80, the receiver 82, and the controller 84 of the audio processor 42 of the telephone unit 12 shown in FIG. 2.

Transmitter 80 is coupled to the fixed gain amplifier 88, and generally includes an analog-to-digital conversion circuit 320, a programmable gain amplifier 322, and a compression circuit 324 for compressing digital signals prior to passing the digital outgoing signals to the digital interface 44 over an output 326. Also included in transmitter 80 are an analog attenuator 330 and a digital attenuator 332. A booster amplifier 328 is included before analog attenuator 330 to increase the signal-to-noise ratio of the outgoing signal before it is treated by analog attenuator 330 or analog-to-digital conversion circuit 320.

Receiver 82 receives digital signals from the digital interface 44 at an input 334. The received digital incoming signal is amplified by a programmable gain amplifier 338. Also included in receiver 82 is a limiter circuit 340 to limit excursion of the digital incoming signal, a digital-to-analog conversion circuit 342, an analog attenuator 350, and a digital attenuator 352. The receiver 82 is coupled to the loud speaker drive 92.

Controller 84 includes a hands-free controller circuit 354, an amplifier 356, an amplifier 358, a transmit speech detector 360, and a receive speech detector 362. Thus, controller 84 samples outgoing digital signals at junction 364 and samples incoming digital signals at junction 366.

Transmitter 80 accepts an outgoing signal as a differential analog input from a microphone 28 (FIG. 1) through analog input amplifier 88, performs analog-to-digital conversion of the outgoing signal by analog-to-digital conversion circuit 320, compresses the then-digital output signal by compression circuit 324, and presents the compressed digital output signal at digital output 326. The output signal also passes through analog attenuator 330 and digital attenuator 332, both of which are under control of hands-free controller circuit 354. Booster amplifier 328 boosts the outgoing analog signal level before analog-to-digital conversion circuit 320 performs its analog-to-digital conversion in order to improve conversion performance. Similarly, programmable gain amplifier 32 is placed before digital attenuator 332 in order that a user may adjust the final signal level of the outgoing digital signal, thereby further allowing for minimization of distortion and noise in the output digital signal produced at digital output 326.

Receiver 82 accepts compressed digital incoming signals at digital input 334, expands the incoming digital signal by expanding circuit 336, passes the incoming digital signal through limiter 340, and performs digital-to-analog conversion by digital-to-analog conversion circuit 342 in order to provide an incoming analog signal to a loudspeaker 30 (FIG. 1) through driver 92. The incoming signals also pass through digital attenuator 352 and analog attenuator 350, both of which are controlled by hands-free controller circuit 354.

A programmable gain amplifier 338 and limiter 340 are placed before junction 366, the point at which incoming signals are sensed by controller 84. This enables the hands-free controller circuit 354 to fairly compare outgoing transmit signals and incoming receive signal levels.

Programmable amplifier 346 is provided in order to compensate for loudspeaker sensitivity, which measures output loudness for a given electrical input. Programmable amplifier 346 is placed after junction 366, the sensing point for incoming signals for controller 84, so that programmable amplifier 346 does not affect one-to-one comparison by controller 84 of outgoing signals and incoming signals. Further, programmable gain amplifier 346 is placed before digital-to-analog conversion circuit 342 in order to optimize performance of digital-to-analog conversion circuit 342.

Transmit speech detector 360 samples signals from transmitter 80 and receive speech detector 362 samples signals from receiver 82. Amplifiers 356 and 358 scale transmit signal levels and receive signal levels, respectively. Transmit speech detector 360 and receive speech detector 362 output to hands-free controller circuit 354 their respective scaled sampled transmit and receive signals. Additionally, transmit speech detector 360 and receive speech detector 362 provide to hands-free controller circuit 354 an indication of whether the respective sampled transmit and receive signals comprise a speech signal or a noise signal. Signals of fairly constant amplitude of, for example, over a 150 millisecond interval, may generally be presumed to be noise signals.

Hands-free controller circuit 354 accepts the respective scaled sampled transmit and receive signal level information, as well as speech or noise signal type indications, from transmit speech detector 360 and receive speech detector 362. Information thus received is used by hands-free controller circuit 354 to determine allocation of losses among the various attenuators 330, 332, 350 and 352.

Hands-free controller circuit 354 preferably provides three stable states and four transitional states of operation. Preferably, the three stable states are idle, transmit, and receive; and the four transitional states are transmit-up, receive-up, transmit-down, and receive-down.

In the transmit stable state, analog attenuator 330 and digital attenuator 332 are forced to zero decibel loss, and analog attenuator 350 and digital attenuator 352 are forced to a programmable maximum loss. In such manner, hands-free controller circuit 354 allows the outgoing signal to pass through the transmitter 80 without loss (theoretically), while any incoming signal received at digital input 334 is suppressed by subjecting it to a programmable maximum loss.

In the receive stable state, on the other hand, analog attenuator 350 and digital attenuator 352 are forced to zero decibel loss, and analog attenuator 330 and digital attenuator 332 are forced to a programmable maximum loss. Hence, losses are distributed to the transmitter 80 while (theoretical) loss-free passage is provided incoming signals through the receiver 82.

In the idle stable state, each attenuator 330, 332, 350 and 352 is forced to one-half the maximum programmable loss. In such a configuration, the audio processor is equally disposed to respond to transmit (outgoing) signals and to receive (incoming) signals. Throughout operation of the audio processor, digital attenuators 332 and 352 may be modified according to volume control values programmed into an internal register (not shown) in the hands-free controller circuit 354.

The four transitional states established by hands-free controller circuit 354 are provided to ensure smooth transitions among the three stable states. During such transitions among the three stable states, losses in each attenuator 330, 332, 350 and 352 are incremented or decremented appropriately to effect the correct transition, preferably in a series of 1.5 decibel steps, until a stable state is achieved.

Preferably, the losses among the various attenuators 330, 332, 350 and 352 are distributed according to several rules: first, losses in analog attenuator 330 and analog attenuator 350 always sum to a constant, which constant is the programmable maximum loss. Further, losses in digital attenuator 332 and digital attenuator 352 sum to the same constant. Such conditions guarantee stability during voice switching operations and assist in ensuring linear analog-to-digital conversion.

Second, at any given time, losses in analog attenuator 330 and digital attenuator 332 are the same and losses in analog attenuator 350 and digital attenuator 352 are the same. This second requirement allows hands-free controller circuit 354 to perform an unbiased comparison of transmit (outgoing) signal levels and receive (incoming)

signal levels, thereby simplifying control circuitry within hands-free controller circuit 354.

Total loss control by hands-free controller circuit 35 in each of transmitter 80 and receiver 82 is split evenly between attenuators 330 and 332 and attenuators 350 and 352 for several reasons. First, such even distribution of losses allows a two point sensing structure by providing a reliably detectable signal level at junctions 364 and 366 in a configuration which is easily stabilized. As an additional benefit, cost of manufacture also decreases because any requirement for additional sensing points is eliminated. Further, even distribution between attenuators 330 and 332 and attenuators 350 and 352 provides an automatic voice control hysteresis which defines the ability of a receive speaker to override a transmit speaker, and vice versa. Third, such even distribution helps prevent clipping distortion in the analog-to-digital conversion process as well as increases resolution of such conversion. Finally, such even distribution enhances stability of the idle state so that hands-free controller circuit 354 may make an unbiased comparisons of transmit (outgoing) signal levels and receive (incoming) signal levels.

The controller circuit 354 is coupled to the digital interface 44 over a bidirectional bus 368. The bus 368 allows the microprocessor to automatically monitor the state of the hands-free controller circuit 354 and provides access for a microprocessor to force the hands-free controller circuit 354 to any given state by a register write through the digital interface 44 to alter operational parameters utilized by the hands-free controller circuit 354. Through such access, the microprocessor may program operational parameters to accommodate different operating environments. Hence, such parametric changes to accommodate different operating environments may be effected through using software to vary performance rather than by changing hardware. This programmability allows operational parameters to be changed during the actual operation of the telephone unit. Thus, alteration of operational parameters may, for example, enable the apparatus 10 to function as a normal full-duplex telephone, a simple transmitter, a simple receiver, or in its normal speakerphone function by employing software programming to change operational parameters.

While particular embodiments of the present invention have been shown and described, modifications may be made, and it is therefore intended to cover in the appended claims all such changes and modifications which fall within the true spirit and scope of the invention.

What is claimed is:

1. An integrated circuit forming a hands-free telephone unit for use in a digital telephone network and in association with an external keypad having a plurality of depressible key switches, an external microprocessor, an external microphone, and an external speaker, said integrated circuit comprising:

keypad monitoring means arranged to be coupled to said external keypad for providing digital key code signals corresponding to the depression of said depressible key switches;

audio processing means arranged to be coupled to said external microphone for converting outgoing analog voltages from said microphone representative of human speech to outgoing digital signals representative of said human speech and arranged for converting incoming digital signals from said network representative of human speech to incoming analog voltages representative of human speech and arranged to be coupled to said external speaker for providing said speaker with said incoming analog voltages; and digital interface means coupled to said audio processing means and said keypad monitoring means and arranged to be coupled to said digital network and said external microprocessor for conveying said incoming digital signals from said network to said audio processing means, said outgoing digital signals to said network, and said digital key code signals to said microprocessor, said digital interface means being arranged to be coupled to said network and said microprocessor by a serial bus, and wherein said digital interface means is arranged to convert parallel-bits of data to outgoing serial-bits of data and serial-bits of data to incoming parallel-bits of data.

2. An integrated circuit as defined in claim 1 further including tone ringer means for providing digital ring signals.

3. An integrated circuit as defined in claim 2 wherein said tone ringer means is coupled between said digital interface and said audio processor for providing said audio processing means with said tone ring digital signals responsive to said microprocessor.

4. An integrated circuit as defined in claim 1 wherein said telephone unit is further arranged for use with an external liquid crystal display and wherein said integrated circuit further includes liquid crystal display contrast control means for providing said liquid crystal display with contrast control voltages.

5. An integrated circuit as defined in claim 4 wherein said contrast control means is coupled to said digital interface for providing said contrast control voltages at a level responsive to said microprocessor.

6. An integrated circuit as defined in claim 1 wherein said audio processing means includes transmitting means for converting said outgoing analog voltages to said outgoing digital signals and receiving means for converting said incoming digital signals to said incoming analog voltages.

7. An integrated circuit as defined in claim 6 wherein said transmitting means includes an analog to digital converter.

8. An integrated circuit as defined in claim 6 wherein said receiving means includes a digital-to-analog converter.

9. An integrated circuit as defined in claim 6 wherein said audio processing means further includes control means coupled to said transmitting means and said receiving means for effectively disabling said transmitting means and effectively enabling said receiving means in response to detecting incoming digital voltages and for effectively disabling said receiving means and effectively enabling said transmitting means in response to detecting outgoing digital signals.

* * * * *